UNITED STATES PATENT OFFICE 2,750,379
Patented June 12, 1956

2,750,379

IMIDAZOLIDINE SALTS OF PENICILLIN

Roy S. Hanslick, Philadelphia, and William F. Bruce, Havertown, Pa., assignors, by mesne assignments, to American Home Products Corporation, New York, N. Y., a corporation of Delaware No Drawing. Application October 6, 1952,
Serial No. 313,374

2 Claims. (Cl. 260—239.1)

This invention relates to imidazole and imidazolidine derivatives, particularly to relatively high molecular weight, ring-substituted imidazole and imidazolidine salts and, more particularly, to penicillin salts thereof.

The compounds of the invention involve imidazole derivatives falling within the scope of the general formula:

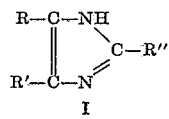

I or its equivalent, tautomeric forms wherein R and R' each represent phenyl or substituted phenyl radicals while R'' represents hydrogen, an aliphatic radical, an alicyclic or heterocyclic radical having a 5- or 6-membered nucleus or an aromatic radical, any of which may involve substituents on the rings or alkyl chain; as well as those compounds falling within the scope of the general formula:

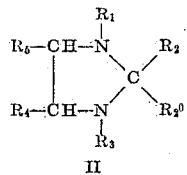

II

In Formula II, the radical $R_1$ represents either hydrogen or aliphatic, aromatic, alicyclic or heterocyclic radicals with or without substituents on the rings or alkyl chains. The radical $R_2^0$ is intended to represent hydrogen or an aliphatic, aromatic or heterocyclic radical but preferably phenyl or substituted phenyl, while the radical $R_2$ represents hydrogen, aliphatic or aromatic radicals, with phenyl or substituted phenyl radicals preferred. The radical $R_3$ represents either hydrogen or an $\alpha$-aryl-alkyl or an $\alpha$-heterocyclic-alkyl, as for example benzyl, $\alpha$-methyl-benzyl, benzhydryl, thenyl, etc. The radicals $R_4$ and $R_5$ represent either hydrogen or an aromatic radical, again preferably phenyl, with or without substituents on the ring. The alicyclic or heterocyclic radicals contemplated are those having 5 to 6 members in the nucleus.

The substituents that have been mentioned hereinabove, which may be on the aryl, alicyclic and heterocyclic rings as well as on the alkyl chain, may comprise from one to three alkyl, alkoxy, halogen, nitro, cyano or dialkylamino substituents. Because of the method of making the compounds of Formulas I and II, amino and hydroxy substituents should not be present but, once the diaza-heterocyclic bases are formed, these substituents would not interfere with the formation of the penicillin salts. In forming salts of the bases and particularly penicillin salts, the only substituents that must be excluded are those having an oxidizing action or strong acid groups and, with these exceptions, no substituent has been found that interferes with the reaction to form penicillin salts.

The imidazole and imidazolidine compounds of the invention are preferably of relatively high molecular weight since it has been found that the higher molecular weight compounds form substantially water-insoluble or at least sparingly water-soluble penicillin salts. An important feature of the invention is the formation of these penicillin salts.

It has been discovered that the substantially water-insoluble, relatively high molecular weight diaza-heterocyclic bases of the invention, specifically those having from about 15 to 27 carbon atoms, with a total molecular weight over about 200, or selected salts of such bases, are capable of combining with penicillin to form especially valuable penicillin salts. Probably because of the high molecular weight, these penicillin salts are all substantially water-insoluble or, at most, only sparingly water-soluble. The value of these compounds to form such salts lies in the fact that they can be used to isolate penicillin from a largely aqueous medium by reacting therewith to form a penicillin salt precipitating from the aqueous medium. Once isolated, one may easily cleave the salt in any known manner, as by treatment with an acid. This use not only permits isolation of the penicillin from an aqueous medium but is a means for purifying the penicillin from impurities, particularly of the non-acidic type.

An important use for the penicillin salts of the invention lies in their ability to maintain the activity of penicillin for a long time and thereby permit long storage without substantial loss of activity. Thus, while the storage of sodium or potassium penicillin without eventual decomposition presents problems, it is quite easy to store the imidazole and imidazolidine salts of penicillin for a very long time without substantial loss of activity. At some later time, if one desired penicillin free of base, the penicillin could be cleaved therefrom in the manner mentioned above.

As an additional discovery, the non-toxic substantially insoluble or sparingly water-soluble salts of penicillin have been found valuable from a pharmacological aspect. In contact with body fluids, these salts slowly release penicillin for utilization in combating bacterial infections. A prolonged antibiotic effect can thus be achieved without difficulty. By the use of these new penicillin salts, one greatly reduces the number of injections required to sustain the desired blood level concentration of penicillin.

Among the imidazole and imidazolidine bases found to yield substantially water-insoluble penicillin salts are those having at least two phenyl radicals as substituents on the carbon atoms of the ring. Where these substituents are located on the ring does not appear to matter. With regard to the imidazolidine ring itself, the radicals represented by $R_1$ and $R_3$ may also be located on one or both of the ring nitrogen atoms. Obviously higher molecular weight bases can be expected to yield more insoluble penicillin salts but, for practical purposes, one need not have substituents with a total carbon content of greater than about 25 carbon atoms. At the lower end of the range, it has been found that there should be a minimum carbon content for the substituents of not less than about 12 carbon atoms to achieve the desired water-insolubility.

If the bases of Formulas I and II are to be used for the preparation of penicillin compounds, they are best used as salts rather than in the form of a free base to avoid the possibility of inactivating the penicillin. The salts may be formed from the free bases by dissolving the latter in a solvent, such as water or ether, to which is added the proper acid depending on the particular salt desired.

The salts formed would be the mono-salts in the case of the imidazoles and may be either mono-salts or di-salts in the case of the imidazolidines depending on the amounts of base and acid used and the substituents on the ring nitrogen atoms. Thus, where both ring nitrogen atoms are unsubstituted, if one mol. equivalent each of acid and base were use, the mono-salt would be formed. On the other hand, if two mol. equivalents or an excess of acid are used with one mol. of the imidazolidine, the di-salt would be formed. For making penicillin salts from the imidazolidines, one would generally desire the double salt instead of the mono-salt since two mols. of penicillin would be combined when using the former whereas only one mol. of penicillin combines with the mono-salt.

Inorganic or organic acids may be used in forming the salts from the free base imidazoles and imidazolidines. The most common inorganic acids are hydrochloric, sulfuric, phosphoric, nitric, or hydrobromic acids. Organic acids which are deemed useful are the lower aliphatic carboxylic acids of the mono-carboxylic, di-carboxylic, and tri-carboxylic classes. Lower alkyl, mono-hydroxy lower alkyl, and di-hydroxy lower alkyl carboxylic acids are deemed useful as well as halogen-substituted compounds and unsaturated aliphatic acids. As specific examples of organic acids, there may be mentioned the acids of 1 to 6 carbon atoms of the mono-carboxylic class such as formic, acetic, propionic, butyric, isovaleric, glycolic, lactic, gluconic, chloracetic, and crotonic acids. Examples of the di-carboxylic class found to be particularly useful are the acids of 3 to 6 carbon atoms such as malonic, succinic, glutaric, adipic, malic, tartaric, glutamic, maleic, and fumaric acids. In the class of the tri-carboxylic acids, citric, isocitric, and aconitic acids are also deemed useful.

It has been found highly advantageous to prepare and use those salts of the bases of Formulas I and II which are water-soluble when seeking to make penicillin salts of these bases. The reason for this lies in the fact that it is desirable to obtain the penicillin salts as a precipitated solid from a substantially aqueous medium. The desired salt may then be easily separated, as by filtration, and purified by washing. Thus, the selected water-soluble imidazole or imidazolidine salt is dissolved in water and reacted with a water-soluble salt of penicillin. The desired penicillin salt, being either substantially water-insoluble or only sparingly water-soluble, precipitates from the aqueous medium and is separated therefrom. Where relatively water-soluble base salts are used in preparing penicillin salts therefrom, less liquid volume need be handled and therefore losses are likely to be less than if relatively insoluble salts are used.

In speaking of water-soluble, sparingly water-soluble, and substantially water-insoluble salts, the generally accepted meaning is intended. However, in order to avoid any question as to meaning, it is preferred to consider a water-soluble salt to be one which will dissolve in water to the extent of at least about 5% by weight per unit of liquid volume at 30° C. A sparingly water-soluble salt would be one whose solubility in water would range from just below this figure to about 1% by weight, while a substantially water-insoluble salt would be one having a solubility less than about 1% by weight per unit of liquid volume at 30° C.

Any of the known soluble penicillin salts may be combined with the poly-substituted imidazole or imidazolidine bases. Thus, one may use the alkali or alkaline earth metal salts of penicillin G, dihydro F, X, or penicillin K for combination with the selected salts of imidazoles or imidazolidines. However, the more preferred penicillin salts are the sodium or potassium salts of penicillin G. One or two molecules of any penicillin above indicated will unite with one molecule of the base, depending on the use of the mono- or the di-salt.

Substituted imidazole bases may be prepared by heating at refluxing temperatures an aromatic diketone with either hexamethylenetetramine or an aliphatic, alicyclic, heterocyclic, or aromatic aldehyde in the presence of ammonium acetate and glacial acetic acid. The illustrated reaction is shown as follows:

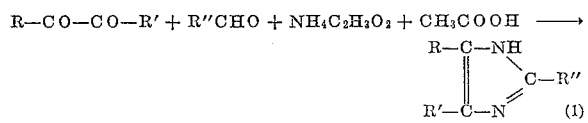

where R, R', and R'' have the meanings as disclosed earlier.

It should be noted that where the 2-position on the ring is to remain unsubstituted (R''=H), hexamethylenetetramine should be used instead of formaldehyde since the former releases formaldehyde slowly. In carrying out the reaction, refluxing is continued for about an hour, the reaction products are then diluted with a small amount of water to precipitate impurities which are removed. The filtrate is then further diluted with a relatively large amount of water thereby causing the precipitation of the desired base.

The substituted imidazolidine bases corresponding to the imidazole bases made as outlined above may easily be prepared by reducing the desired imidazole with hydrogen in the presence of a hydrogenation catalyst, preferably using either platinum oxide or palladium on charcoal.

The imidazolidine bases may also be prepared without resort to a reduction of the corresponding imidazole compounds. One method for preparing selected imidazolidine bases where the 2-position is either unsubstituted or where only a mono-substitution is desired involves reacting ethylenediamine or an N- or N,N'-disubstituted ethylenediamine with an aldehyde. The reaction would be as follows:

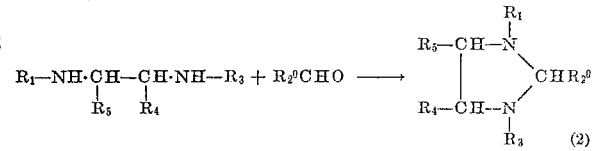

The radicals $R_1$, $R_2^0$, $R_3$, $R_4$, and $R_5$ would have the meanings assigned to them as hereinbefore described.

Where an imidazolidine compound having two substituents in the 2-position is desired, Reaction 2 is modified by using a di-halo-disubstituted methane in place of the aldehyde and refluxing with a solvent such as butanol until the reaction is completed. An illustrative reaction is shown as follows:

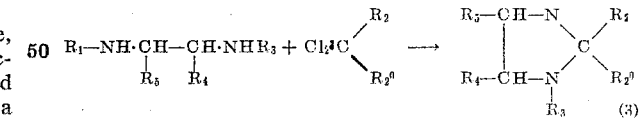

The radicals $R_1$, $R_2$, $R_2^0$, $R_3$, $R_4$, and $R_5$ are intended to have the same meaning as given heretofore. As already indicated, it is preferred that $R_2^0$ and $R_2$ should both stand for aryl or substituted aryl radicals.

The following examples will illustrate the invention in greater detail. It should be understood, however, that the examples are merely for illustrative purposes and are not to be considered limitative of the invention.

EXAMPLE 1

*Preparation of 4,5-diphenylimidazole and a salt thereof*

Benzil (10.5 gm.) (0.05 M); hexamethylene tetramine (1.3 gm.) (0.01 M) and ammonium acetate (30.0 gm.) (0.4 M) are added to 250 cc. of glacial acetic acid. The mixture is refluxed for one hour and then diluted to 2500 cc. with water. The slight turbidity is removed with charcoal. The filtered solution is chilled and dry ammonia gas is passed into the solution to precipitate 4,5-diphenylimidazole. The material is dissolved in ether and then dry hydrogen chloride gas is passed into the solution to precipitate the imidazole-hydrochloride. Filter and dry. M. pt. 135° C.

EXAMPLE 2

*Preparation of 2,4,5-triphenylimidazole and a salt thereof*

Benzil (10.5 gm.) (0.05 M) and ammonium acetate (50.0 gm.) (0.65 M) are added to 250 cc. of glacial acetic acid. The mixture is refluxed for one hour and diluted then with 200 cc. of water; collecting a white precipitate. The filtrate is further diluted with water to 2500 cc. volume causing the precipitate of the product which is crystallized from hot pyridine by the addition of an equal volume of water. Filter and dry. M. P. 273–4° C. The 2,4,5-triphenylimidazole is dissolved in small volume of ethanol and then dry hydrogen chloride gas is passed into the solution. Add ether to precipitate the hydrochloride salt. Filter and dry. M. P. 155° C.

EXAMPLE 3

*Preparation of 2,4,5-tri-(p-methoxyphenyl)-imidazole and a salt*

Anisil (10.5 gm.) (0.04 M) and ammonium acetate (50.0 gm.) (0.65 M) are added to 250 cc. of glacial acetic acid. The mixture is refluxed for one hour and diluted with 200 cc. of water. The solution is filtered and further diluted with water to a volume of 2500 cc. The white precipitate is filtered and dried. M. P. 82° C. This product is dissolved in ethanol and then dry hydrogen chloride gas is passed into the solution. Upon concentrating the solution a white crystalline solid remains. M. P. 136–8° C.

EXAMPLE 4

*Preparation of 2-(2-furyl)-4,5-diphenylimidazole and a salt thereof*

Benzil (21.0 gm.) (0.2 M), furfural (19.2 gm.) (0.2 M) and ammonium acetate (60.0 gm.) (0.77 M) are added to 500 cc. of glacial acetic acid. The mixture is refluxed for one hour and then diluted with 200 cc. of water. Filter and the filtrate is added to 2000 cc. of water to precipitate the imidazole. Filter and dry. M. P. 188–9° C. The imidazole compound is dissolved in ethanol and dry hydrogen chloride gas is passed into the solution. Then distill off the ethanol by vacuum leaving an oil which upon the addition of acetone causes crystallization. M. P. 153–4° C.

EXAMPLE 5

*Preparation of 2,2-diphenylimidazolidine and a salt thereof*

Diphenyldichloromethane (23.7 gm.) (0.1 M) and ethylenediamine hydrate (7.8 gm.) (0.1 M) are heated in 50 cc. n-butanol under reflux for 4–5 hours. The solid is filtered off. To the filtrate add 75 cc. of ethanol and then pass dry hydrogen chloride gas into the solution. Filter off any solid which results. The solution is then concentrated under vacuum leaving behind as residue a white crystalline solid. M. P. 163° C.

EXAMPLE 6

*Preparation of 2,2-di-(p-chlorophenyl)imidazolidine and a salt thereof*

Di-(p-chlorophenyl)-dichloromethane (30.6 gm.) (0.1 M) and ethylenediamine hydrate (7.8 gm.) (0.1 M) are heated in 75 cc. of n-butanol for four hours. The solid crystalline material is filtered off. To the filtrate add 75 cc. of ethanol and then pass dry hydrogen chloride gas into the solution. Filter off any solid which results. The solution is then concentrated under vacuum leaving behind a very viscous liquid.

EXAMPLE 7

*Preparation of 2-methyl-4,5-diphenylimidazolidine and a salt thereof*

2-methyl-4,5-diphenylimidazole (7.0 gm.) (0.03 M) is dissolved in 100 cc. of ethanol to which is added 2.0 gm. of palladium on charcoal and then catalytically reduced in the presence of hydrogen. The solution is filtered; concentrated by vacuum to half its volume and an equal volume of ether is added. Pass into the solution dry hydrogen chloride gas to precipitate the imidazolidine-dihydrochloride which is filtered and dried. M. P. 251–2° C.

EXAMPLE 8

*Preparation of 1,3-dibenzylimidazolidine-dihydrochloride*

N,N'-dibenzylethylenediamine-dihydrochloride (31.3 gm.) (0.1 M) is added to 100.0 cc. of 37% formaldehyde solution and heated on a steam bath until a clear solution results. Cool the solution to room temperature and filter off white crystalline solid. Dry. M. P. 192° C.

EXAMPLE 9

*Preparation of 2-phenyl-1,3-dibenzylimidazolidine*

N,N'-dibenzylethylenediamine (12.0 gm.) (0.05 M) is added to 25. cc. of ethanol containing benzaldehyde (5.3 gm.) (0.05 M). Upon vigorous stirring a reaction occurs with evolution of heat and separation of a white crystalline solid. Allow the solution mixture to cool, filter off solid and dry. M. P. 101–2° C.

Following the procedures disclosed hereinabove, other diamines may be used in preparing imidazolidine compounds whereby the latter, in the form of their salts, have the common utility of isolating penicillin from an aqueous medium. The following N-mono-substituents, represented by $R_1$ on the ethylenediamine molecule, are particularly contemplated: 4-methyl-2-pentyl, 1-heptyl, 2-heptyl, trimethylhexyl, undecyl, lauryl, p-methylbenzyl, p-methoxybenzyl, p-nitrobenzyl, diethylaminobenzyl, p-chlorobenzyl, 2,4-dichlorobenzyl, 3,4-dichlorobenzyl, piperonyl, benzhydryl, beta-phenylethyl, gamma-phenylpropyl, alpha-methylbenzyl, naphthyl, furfuryl, 2-pyridyl, alpha-pyridylethyl, 2-(3,4,5 or 6-methylpyridyl), 2-thiazolyl, isoquinolyl, 2-(5-methylfuryl), cyclopentyl, cyclohexyl, 3-methylcyclohexyl, and 4-methoxycyclohexyl radicals. Also contemplated are other alkylenediamines of the N,N'-disubstituted type where $R_1$ stands for the radicals indicated above, but particularly the alpha-(aryl- or heterocyclic)-alkyl type, while $R_3$ stands for p-methylbenzyl, p-methoxybenzyl, p-nitrobenzyl, diethylaminobenzyl, p-chlorobenzyl, 2 or 3,4-dichlorobenzyl, piperonyl, benzhydryl, alpha-methylbenzyl, alpha-ethylbenzyl, alpha-pyridylmethyl, or furfuryl radicals.

The following examples illustrate the preparation of penicillin salts from the corresponding imidazoles and imidazolidines.

EXAMPLE 10

*Preparation of 4,5-diphenylimidazole-pencillin-G*

4,5-diphenylimidazole-hydrochloride (2.59 gm.) (0.01 M) is dissolved in 75 cc. of water to which is added, with stirring, potassium-penicillin-G (3.74 gm.) (0.01 M) dissolved in 25 cc. of water. The white precipitate is filtered, washed with water and then dried. M. P. 96–7° C. Analysis: Sulfur calc. 5.74%. Found 5.7%.

EXAMPLE 11

*Preparation of 2,4,5-triphenylimidazole-pencillin-G*

2,4,5-triphenylimidazole-hydrochloride (3.3 gm.) (0.01 M) is dissolved in 60 cc. of water containing 20 cc. of ethanol to which is added potassium-penicillin-G (3.74 gm.) (0.01 M) dissolved in 15 cc. of water. The white precipitate is filtered, washed with water and then dried. M. P. 112–3° C. Analysis: Sulfur calc. 5.1%. Found 4.5%.

EXAMPLE 12

*Preparation of 2,4,5-tri-(p-methoxyphenyl)imidazole-pencillin-G*

2,4,5-tri-(p-methoxyphenyl)imidazole-hydrochloride (4.2 gm.) (0.01 M) is dissolved in 15 cc. of acetone to which is added, with stirring, potassium-pencillin-G (3.74 gm.) (0.01 M) dissolved in 75 cc. of water. The precipitate is filtered, washed with water and then dried. M. P. 94° C. Analysis: Nitrogen calc. 4.45%. Found 4.89%.

EXAMPLE 13

*Preparation of 2-(2-furyl)4,5-diphenylimidazole-penicillin-G*

2 - (2 - furyl) - 4,5 - diphenylimidazole - hydrochloride (2.0 gm.) (0.0062 M) is dissolved in 20 cc. of ethanol to which is added, with stirring, potassium penicillin-G (2.3 gm.) (0.0061 M) dissolved in 100 cc. of water. The precipitate is filtered, washed with water and then dried. M. P. 97–8° C. Analysis: Nitrogen calc. 9.0%. Found 8.4%.

EXAMPLE 14

*Preparation of 2-phenyl-1,3-dibenzylimidazolidine-dipenicillin-G*

Potassium penicillin-G (14.9 gm.) (0.04 M) is dissolved in 25 cc. of water to which is added dropwise phosphoric acid to a pH 2. The free penicillin is extracted with ether and dried over anhydrous magnesium sulfate. 2-phenyl-1,3-dibenzylimidazolidine (6.6 gm.) (0.02 M) dissolved in 50 cc. of ether is added, with shaking, to the clear ethereal penicillin-G solution. The resulting white precipitate is filtered off, washed with small quantities of ether and then dried. M. P. 102–3° C. Analysis: Sulfur calc. 6.4%. Found 6.8%.

EXAMPLE 15

*Preparation of 2,2-diphenylimidazolidine-dipenicillin-G*

2,2-diphenylimidazolidine-dihydrochloride (2.97 gm.) (0.01 M) is dissolved in 15 cc. of water to which is added, with stirring, potassium-penicillin-G (7.44 gm.) (0.02 M) dissolved in 10 cc. of water. The resulting white precipitate is filtered, water washed and then dried. M. P. 157–8° C. Analysis: Sulfur calc. 7.2%. Found 7.3%.

EXAMPLE 16

*Preparation of 2,2-(p-chlorophenyl)imidazolidine-dipenicillin-G*

2,2 - (p-chlorophenyl) - imidazolidine - dihydrochloride (1.83 gm.) (0.005 M) is dissolved in 75 cc. of water to which is added, with stirring, potassium-penicillin-G (3.74 gm.) (0.01 M) dissolved in 25 cc. of water. The light tan colored precipitate is filtered, washed with water and then dried. M. P. 125–7° C. Analysis: Sulfur calc. 6.6%. Found 6.34%.

EXAMPLE 17

*Preparation of 2-methyl-4,5-diphenylimidazolidine-dipenicillin-G*

2 - methyl - 4,5 - diphenylimidazolidine - dihydrochloride (M. P. 251–2° C.) (1.55 gm.) (0.005 M) is dissolved in 70 cc. of water to which is added, with stirring, potassium-penicillin-G (3.74 gm.) (0.01 M) dissolved in 20 cc. of water. The resulting white precipitate is filtered, washed with water and then dried. M. P. 108–109° C. Analysis: Nitrogen calc. 9.3%. Found 9.12%.

EXAMPLE 18

*Preparation of 1,3-dibenzylimidazolidine-dipenicillin-G*

1,3-dibenzylimidazolidine-dihydrochloride (1.65 gm.) (0.005 M) is dissolved in 80 cc. of water to which is added, with stirring, potassium-penicillin-G (3.74 gm.) (0.01 M) dissolved in 20 cc. of water. The white precipitate is filtered, washed with water and then dried. M. P. 82–4° C. Analysis: Moisture 3.16%. Sulfur calc. 6.8%. Found 5.8%.

All of the penicillin salts of the imidazole and imidazolidine bases may be cleaved to recover active penicillin if so desired. Since the higher molecular weight penicillin compounds are substantially water-insoluble or at least only sparingly water-soluble, the water-soluble salts of these bases are useful for freeing penicillin from other water-soluble, non-acidic substances that are relatively inert. The penicillin salts themselves may be used for purposes of storage, as hereinabove mentioned. On the other hand, when they are utilized for their therapeutic effect, their range from sparingly water-soluble to relative insolubility permits wide variation in obtaining long lasting blood levels. The physician is therefore given a choice of penicillin products varying in their blood level effects.

It is also obvious that therapeutic compositions may include a mixture of penicillin salts combining quick acting with long acting penicillin compounds. Likewise, one may include various suspending agents such as sodium-carboxymethylcellulose, gelatines, various gums, etc., where water is the medium to be used, or aluminum monostearate in oil. For all practical purposes, one may use a selected penicillin compound of the invention as one would use the well-known procaine-penicillin-G.

Many modifications and changes within the skill of the art will be readily apparent and are contemplated as falling within the scope of the invention as defined in the appended claims.

We claim:

1. A penicillin salt of 1,3-dibenzylimidazolidine.
2. A penicillin salt of an imidazolidine base, the latter having the general formula

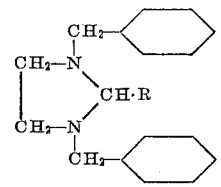

wherein R is selected from the group consisting of hydrogen and phenyl.

References Cited in the file of this patent

UNITED STATES PATENTS

| | | |
|---|---|---|
| 1,805,953 | Morton | May 19, 1931 |
| 2,264,894 | Shoemaker et al. | Dec. 2, 1941 |
| 2,514,181 | Smith | July 4, 1950 |
| 2,546,169 | Salvin et al. | May 27, 1951 |
| 2,550,398 | Barol | Apr. 24, 1951 |
| 2,558,014 | Stiller | June 26, 1951 |
| 2,598,508 | Cooper | May 27, 1952 |
| 2,625,543 | Ruskin | Jan. 13, 1953 |
| 2,631,152 | Ritter et al. | Mar. 10, 1953 |
| 2,694,062 | Frederiksen et al. | Nov. 9, 1954 |

OTHER REFERENCES

Westfelt: "Acta Chem. Scand.," vol. 5, #2 (1951), pp. 327–28.

Parkins: "Science," vol. 101 (1945), page 204.

Brett et al.: "Arzeimittel Forch.," vol. 1, August 1951, pp. 215–17.